United States Patent
Corcoran et al.

(10) Patent No.: US 10,699,112 B1
(45) Date of Patent: Jun. 30, 2020

(54) IDENTIFICATION OF KEY SEGMENTS IN DOCUMENT IMAGES

(71) Applicant: Automation Anywhere Inc., San Jose, CA (US)

(72) Inventors: Thomas Corcoran, San Jose, CA (US); Vibhas Gejji, Fremont, CA (US); Stephen Van Lare, San Jose, CA (US)

(73) Assignee: Automation Anywhere, Inc., San Jose, CA (US)

( * ) Notice: Subject to any disclaimer, the term of this patent is extended or adjusted under 35 U.S.C. 154(b) by 92 days.

(21) Appl. No.: 16/146,562

(22) Filed: Sep. 28, 2018

(51) Int. Cl.
*G06K 9/00* (2006.01)
*G06K 9/62* (2006.01)
*G06N 20/00* (2019.01)
*G06F 16/34* (2019.01)
*G06F 16/31* (2019.01)

(52) U.S. Cl.
CPC ....... *G06K 9/00463* (2013.01); *G06F 16/313* (2019.01); *G06F 16/34* (2019.01); *G06K 9/6256* (2013.01); *G06N 20/00* (2019.01)

(58) Field of Classification Search
CPC ............ G06K 9/00463; G06K 9/6256; G06K 9/00469; G06K 9/00456; G06K 9/00483; G06K 2209/01; G06F 16/34; G06F 16/313; G06F 16/93; G06F 16/5846; G06F 16/951; G06F 16/3329; G06F 16/3331; G06F 16/3347; G06F 40/30; G06F 40/284; G06N 20/00; G06N 3/0445; G06N 3/08; G06N 3/0454

See application file for complete search history.

(56) References Cited

U.S. PATENT DOCUMENTS

| | | | | |
|---|---|---|---|---|
| 8,831,361 B2 * | 9/2014 | Pintsov | .............. | G06K 9/00483 382/209 |
| 9,678,992 B2 * | 6/2017 | Wang | .................... | G06F 16/583 |
| 10,095,925 B1 * | 10/2018 | Tripuraneni | ....... | G06K 9/00456 |
| 10,140,510 B2 * | 11/2018 | Shustorovich | ..... | G06K 9/00422 |
| 10,489,682 B1 * | 11/2019 | Kumar | ...................... | G06N 3/08 |
| 2003/0076995 A1 * | 4/2003 | Morita | ............... | G06K 9/00449 382/181 |
| 2004/0006742 A1 * | 1/2004 | Slocombe | ............. | G06F 40/123 715/234 |
| 2006/0001932 A1 * | 1/2006 | Sekiguchi | .......... | H04N 1/00416 358/537 |
| 2008/0201651 A1 * | 8/2008 | Hong | .................... | G06F 16/951 715/764 |

(Continued)

OTHER PUBLICATIONS

Enriching Word Vectors with Subword Information, P. Bojanowski, E. Grave, A. Joulin, T. Mikolov, Facebook AI Research, arXiv:1607.04606, Jun. 2017.

(Continued)

*Primary Examiner* — Michael S Osinski
(74) *Attorney, Agent, or Firm* — Prasad IP, PC

(57) ABSTRACT

A system and method of automatically learning new keywords in a document image based on context such as when a never before seen keyword exists surrounded by other key-value pairs. A machine learning based approach leverages subword embeddings and two-dimensional geometric contexts in a gradient boosted trees classifier. Keys may be composed of multi-word strings or single-word strings.

18 Claims, 8 Drawing Sheets

(56) References Cited

U.S. PATENT DOCUMENTS

| | | | | |
|---|---|---|---|---|
| 2010/0278453 | A1* | 11/2010 | King | G06F 40/197 |
| | | | | 382/321 |
| 2010/0306260 | A1* | 12/2010 | Dejean | G06F 40/258 |
| | | | | 707/776 |
| 2011/0125735 | A1* | 5/2011 | Petrou | G06F 16/532 |
| | | | | 707/723 |
| 2011/0222789 | A1* | 9/2011 | Aizawa | G06K 9/4604 |
| | | | | 382/229 |
| 2011/0285874 | A1* | 11/2011 | Showering | G06K 9/033 |
| | | | | 348/231.99 |
| 2012/0128251 | A1* | 5/2012 | Petrou | G06K 9/00456 |
| | | | | 382/182 |
| 2013/0039537 | A1* | 2/2013 | Yamazaki | G06T 11/00 |
| | | | | 382/103 |
| 2013/0114914 | A1* | 5/2013 | Dejean | G06K 9/00469 |
| | | | | 382/317 |
| 2013/0236111 | A1* | 9/2013 | Pintsov | G06K 9/00483 |
| | | | | 382/224 |
| 2013/0251247 | A1* | 9/2013 | Khorsheed | G06K 9/4642 |
| | | | | 382/159 |
| 2015/0135046 | A1* | 5/2015 | Moore | G06Q 10/06311 |
| | | | | 715/202 |
| 2017/0061294 | A1* | 3/2017 | Weston | G06N 3/0454 |
| 2017/0308517 | A1* | 10/2017 | Josifovski | G06F 16/313 |
| 2018/0173698 | A1* | 6/2018 | Dubey | G06F 16/3347 |
| 2018/0174020 | A1* | 6/2018 | Wu | G06N 3/006 |
| 2018/0174579 | A1* | 6/2018 | Henry | G06F 40/289 |
| 2018/0330729 | A1* | 11/2018 | Golipour | G10L 15/16 |
| 2018/0336183 | A1* | 11/2018 | Lee | G06F 40/30 |
| 2019/0034994 | A1* | 1/2019 | Wu | G06Q 50/01 |
| 2019/0197119 | A1* | 6/2019 | Zhang | G06F 40/49 |
| 2019/0332658 | A1* | 10/2019 | Heckel | G06N 3/0454 |
| 2019/0370336 | A1* | 12/2019 | Prakash | G06N 3/0445 |

OTHER PUBLICATIONS

Introduction to Boosted Trees, xgboost developers (2016).

A density-based algorithm for discovering clusters in large spatial databases with noise, Ester, Martin; Kriegel, Hans-Peter; Sander, Jörg; Xu, Xiaowei, Simoudis, Evangelos; Han, Jiawei; Fayyad, Usama M., eds., Proceedings of the Second International Conference on Knowledge Discovery and Data Mining (KDD-96). AAAI Press. pp. 226-231 (1996).

* cited by examiner

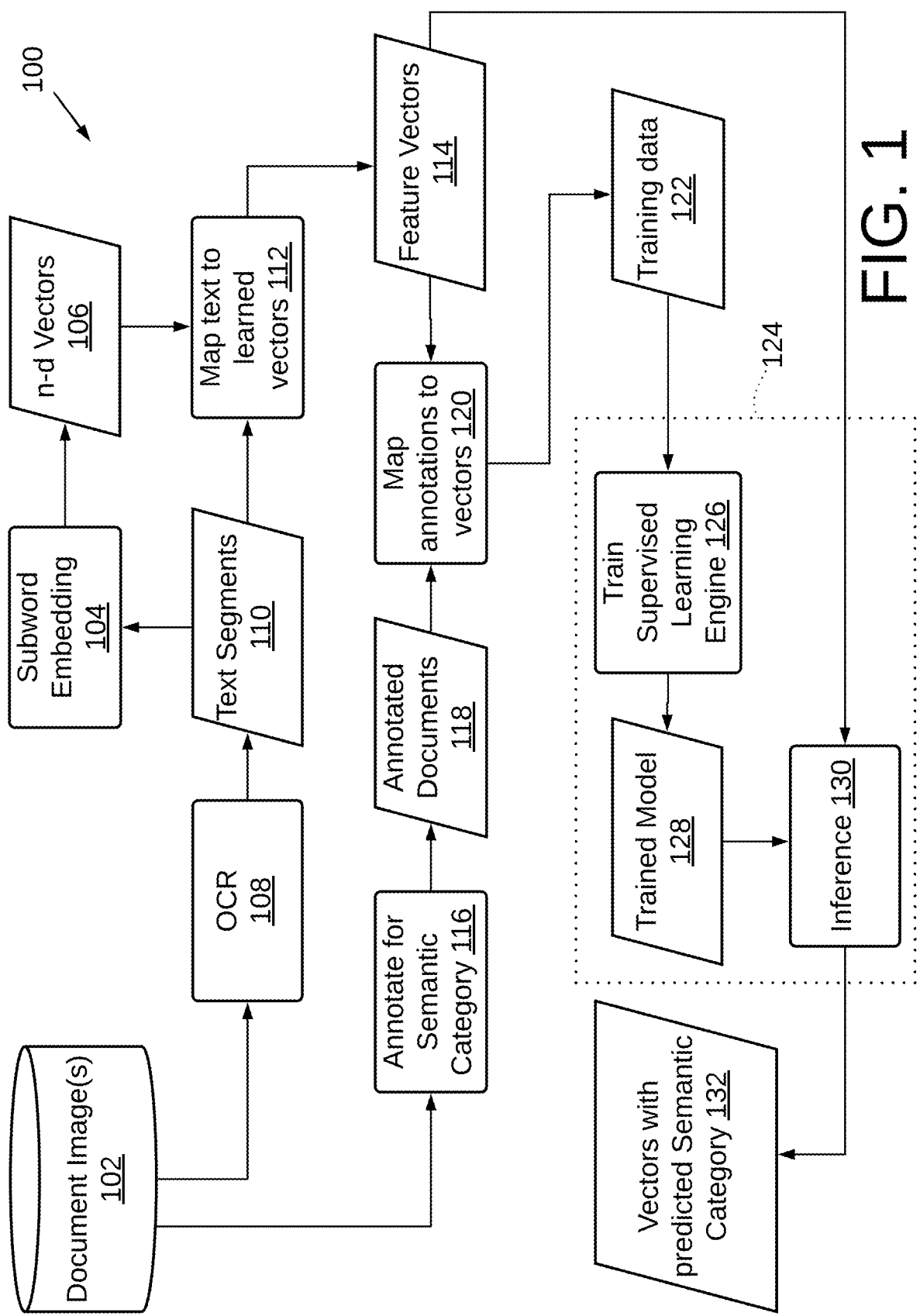

204

Bill To:
Your Company, Inc.
123 Fake St.
San Jose, CA 95134

FIG. 2B

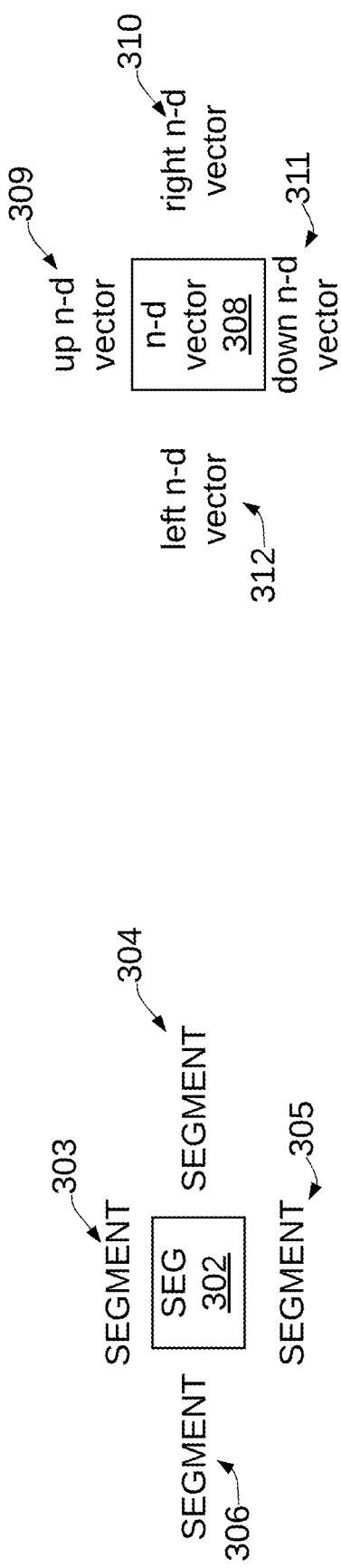

IDENTIFICATION OF KEY SEGMENTS IN DOCUMENT IMAGES

FIELD OF THE DISCLOSURE

This disclosure relates generally to the field of data processing systems and more particularly to detection and retrieval of information from digitized documents.

BACKGROUND

Accurate identification and extraction of data from business documents is an important aspect of computerized processing of business documents. Many business documents contain a regular set of information in the form of a label (or key) with an associated value. Such documents are usually formatted in a manner to be easily discernible to a human. While the documents have a discernible structure, they tend to have numerous variations that make computerized processing problematic and error prone. For example, the documents are typically received in image form, so the content must be extracted for computerized processing. This can lead to numerous errors. For example, two versions of the same document may have visual differences due to scanning differences, say at different resolutions, or because of visual artifacts in the documents. Moreover, it is often the case that the same type of business document, such as an invoice for example, will have differences in formatting, differences in terminology and differences in the granularity and amount of information. There is accordingly a need for improved computerized processing of business documents.

SUMMARY

A computerized system and method for identifying keywords in a document image is disclosed herein where a document image is retrieved from a set of document images where each document in the set of document images contains information organized in a two-dimensional structure and contains keywords, where each keyword of a set of the keywords has a value associated therewith. The document image is processed to identify text segments. The text segments from the document image are processed to identify subword embeddings, representing character groups in the document image. An n-dimensional vector is generated for each text segment from its subword embeddings. Then, for each identified text segment, one or more of the n-dimensional vectors from the neighboring text segments are mapped to generate for each identified text segment, a feature vector which describes the local context of that segment. An annotated version of the document image containing a visual indication associated with each visual indication of a keyword in the document is retrieved and each visual indication of a keyword in the annotated version of the document image is associated with a corresponding feature vector to generate a training document. The foregoing operations are repeated for each document from the set of documents to generate a set of training documents. The foregoing permits automated identification of text segments in a document that are keywords.

Additional aspects related to the invention will be set forth in part in the description which follows, and in part will be apparent to those skilled in the art from the description or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive techniques disclosed herein. Specifically:

FIG. 1 is a high-level flow diagram of an embodiment of a system for performing semantic key segmentation.

FIG. 2B shows an expanded view of element 204 of FIG. 2A.

FIGS. 3A and 3B illustrate a model of segment overlap employed in certain embodiments.

FIG. 3C illustrates a feature vector.

DETAILED DESCRIPTION

Figure 2A:
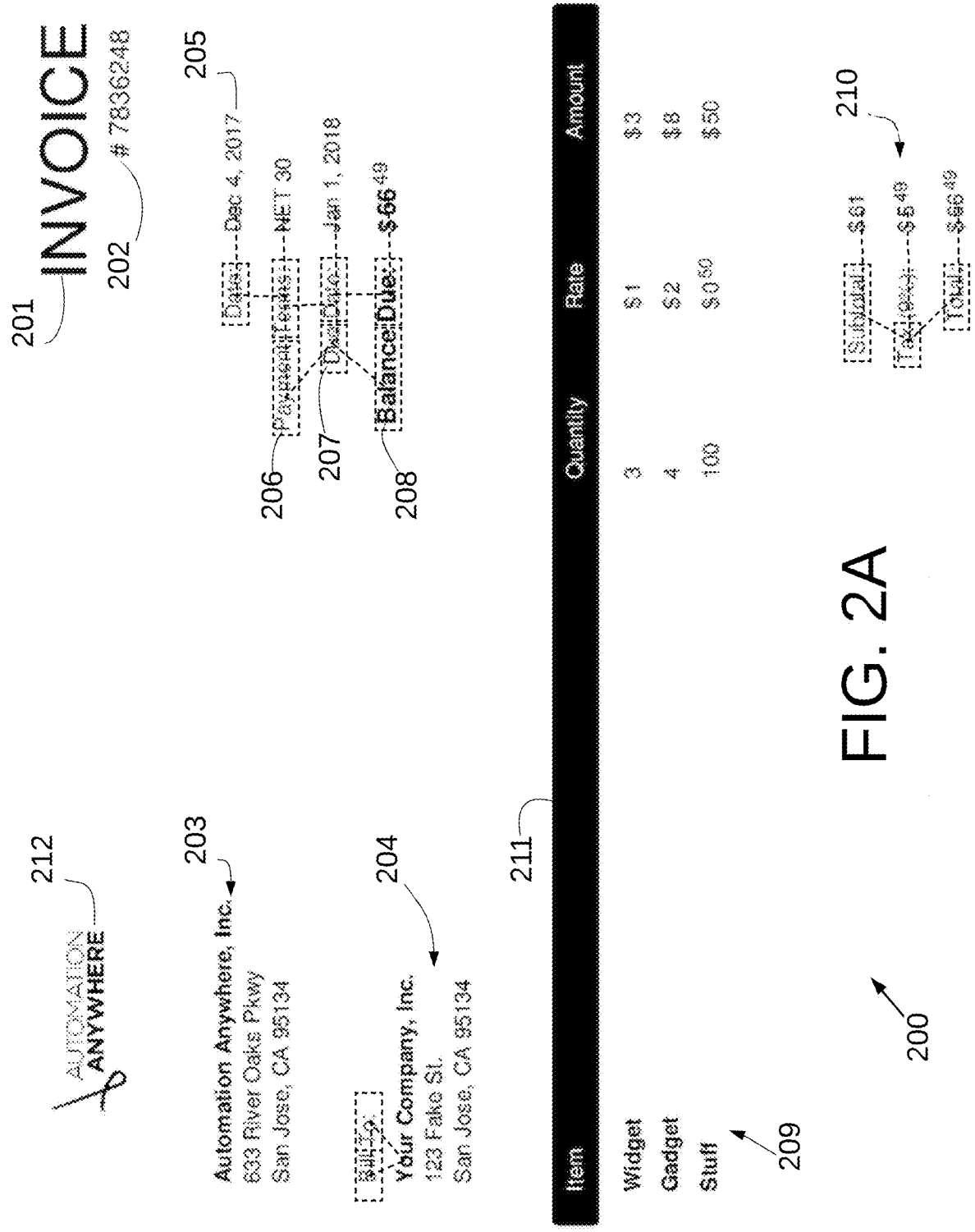
FIG. 2A shows an example of a typical domain document (English-language invoice) that may be processed by the system of FIG. 1.

In the following detailed description, reference will be made to the accompanying drawings, in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

Business forms typically contain many composed layout elements such as tables or key-value pairs, where a key or label is visually associated with a value. In a business form such as an invoice, key-value pairs can be one of the most vital elements, as much of the extractable information in invoices can be found in these key-value pairs. Key-value pairs are also some of the most atomic structures of any layout element, and perhaps the smallest unit that holds any semantic value. As such, correct segmentation and identification of key-value pairs is a vital step in many extraction pipelines whether it be a fully-automated, non-layout-based extraction or template matching-based extraction. Disclosed herein are novel methods and systems that focus on identification of key segments within business forms, such as invoice document images. The machine learning based approach disclosed leverages subword embeddings and two-dimensional geometric contexts in a gradient boosted trees classifier, such as described by P. Bojanowski, E. Grave, A.

Joulin, T. Mikolov, in "Enriching Word Vectors with Subword Information", Facebook AI Research, arXiv: 1607.04606 [cs.CL] or also in XGBoost Documentation, available at https://xgboost.readthedocs.io/en/latest/.

In the case of invoice documents, keys can be composed of multi-word strings or single-word strings, such as "Total Balance Due" or just "Total". The scope may be simplified to a binary classification problem by asking the question, given a single word segment, is it part of a valid key segment? The machine learning based approach disclosed herein does not attempt to group word segments to complete multi-word keyword segments. The disclosed systems and methods are capable of automatically learning new keywords based on context such as when a never before seen keyword exists surrounded by other key-value pairs, where the key in the key-value pair corresponds to a keyword. The disclosed systems/methods enable keyword/non-keyword disambiguation based on two-dimensional geometric context and identification of novel keywords for structured documents, in image form, where the two-dimensional geometric structure is important to understanding of the document. More generally, the disclosed systems/methods permit identification of nodes in a graph of connected graphs.

FIG. 1 is a high-level block diagram of an embodiment of a system 100 for semantic key segmentation in document images. Document images 102 comprise a plurality of images where each image is a digitized document with each pixel encoded as one or more bits. For example, a common encoding is each pixel being represented in an RGB encoding of 8-bits per color dimension for a total of 24-bits per pixel. In certain embodiments, the document images 102 are encoded with each being a 1-bit depth, 1 channel (monochrome) image consisting largely of machine printed text, with the remaining bits per pixel being unused.

Figure 2C:
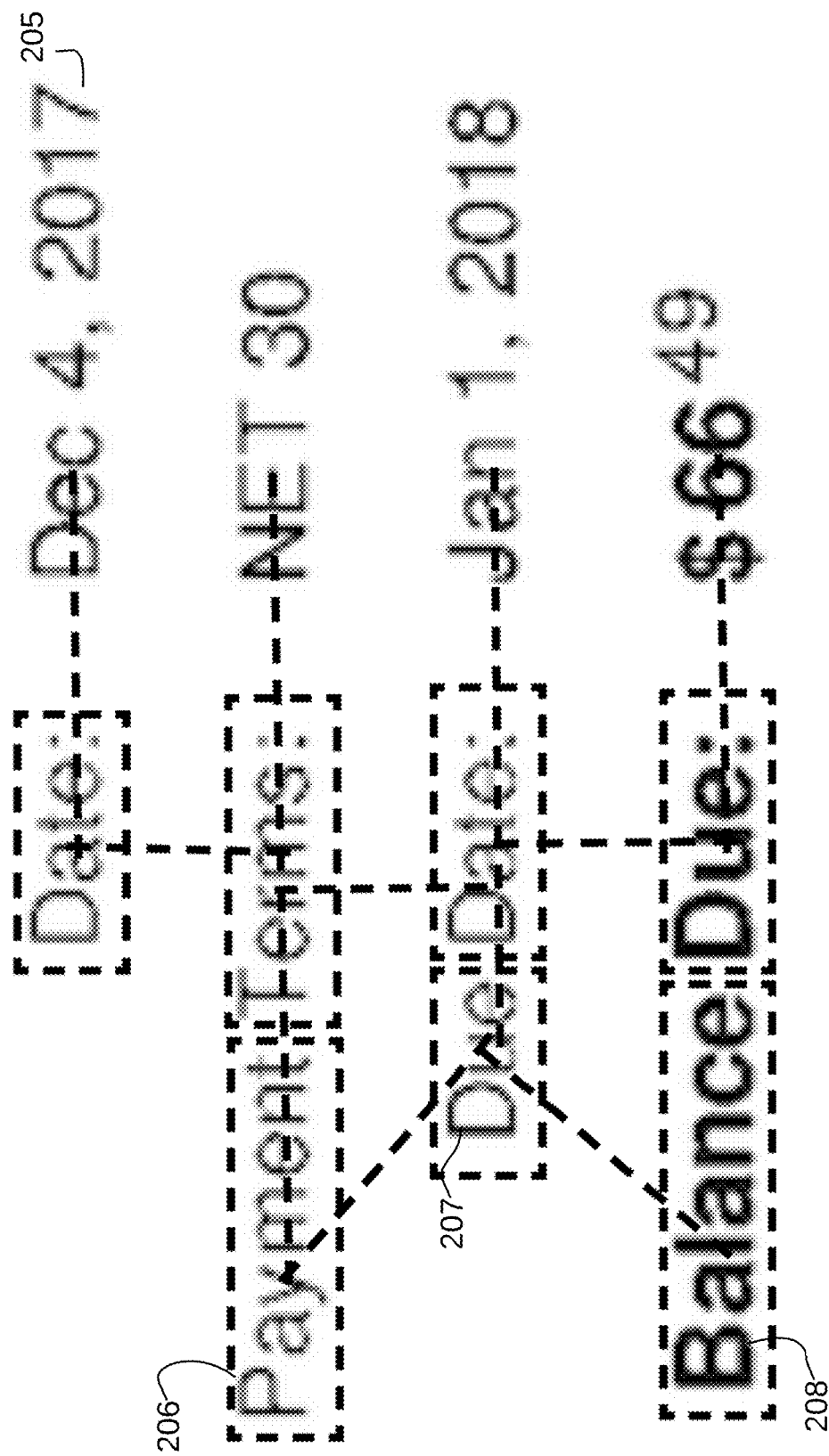
FIG. 2C shows an expanded view of elements 205, 206, 207 and 208 of FIG. 2A.
Figure 2D:
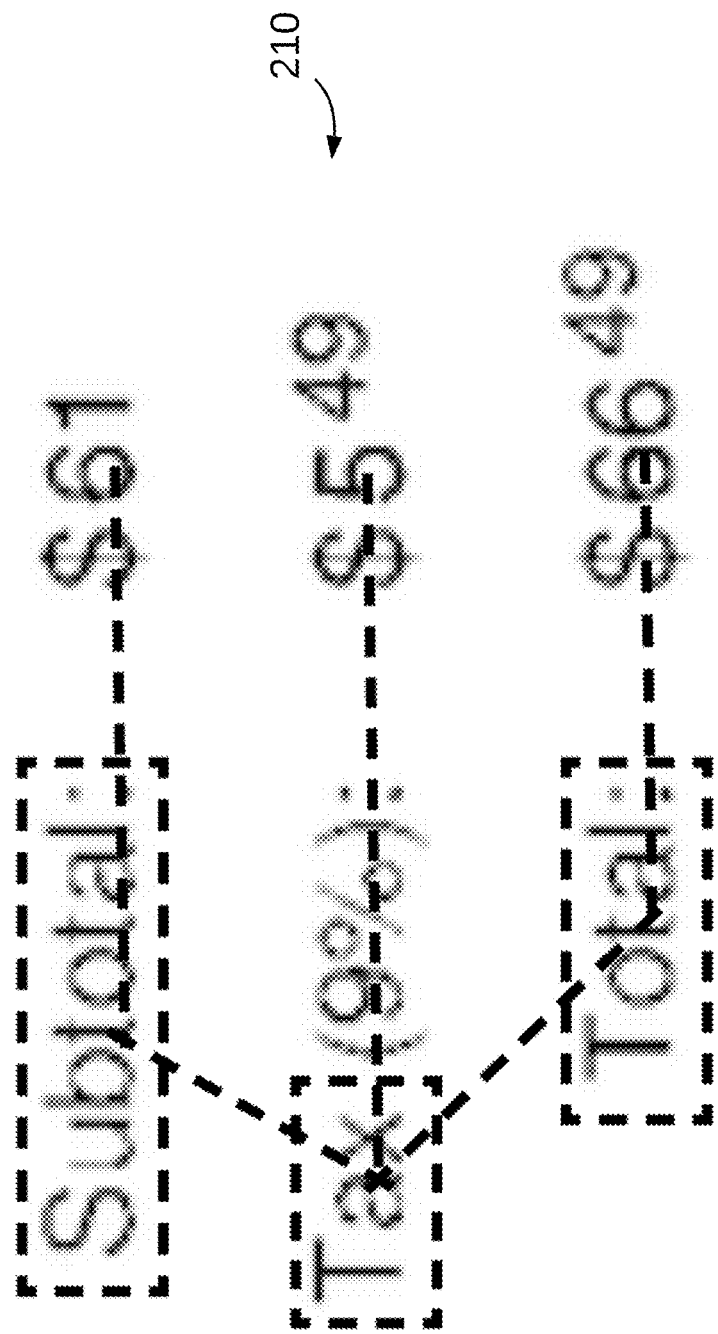
FIG. 2D shows an expanded view of element 210 of FIG. 2A.

FIG. 2A shows an example of a typical domain document (English-language invoice) converted to a monochrome image. As seen, invoice 200, which may be one of the document images 102, has a number of labels and associated data fields that are necessary for an invoice. The invoice is labeled as an "invoice" at 201. There is an invoice number 202 that uniquely identifies the invoice. The invoicing entity and address, seen at 203, identify the entity issuing the invoice. The recipient of the invoice is shown at 204. In addition, the invoice has a date field 205, payment terms 206, a due date 207 and a balance due 208. An itemized listing of the items supplied by the invoicing entity is shown at 209, with associated amounts for quantity, rate (price per item), and total amount for the item. Subtotal amount, tax and total are shown at 210. The invoice 200 can also be seen to be formatted with text of different sizes and with varying font characteristics such as the use of bold font in certain places such as for "Balance Due" at 208 for the label "Balance Due" and the associated amount "$66.49". As seen the amount 66.49 is in a form in which the cents are represented in a smaller font, in superscript format. As will be appreciated by those skilled in the art, alternative representations may also be found in other invoices. Different sizes of fonts are also used, such as for Invoice field 201 which is in a larger font than other fields. A company logo is also seen at 212. Also, a table header bar is seen at 211 with text in reverse color (white on black) contained therein. Certain elements of FIG. 2A may be seen more clearly in FIGS. 2B, 2C and 2D. As seen in FIG. 2B, segments "Bill" and "To" are identified by horizontal line 220 as being horizontally related. In addition, segments "Bill" and "To" are related in a second dimension to segment "Your". In FIG. 2C, segment "Date" is identified as being horizontally related to segment "Dec", and is related in a second dimension (vertically) to segment "Terms". Segment "Payment" is horizontally related to segment "Terms", which is vertically related to segment "Date", which is horizontally related to segment "Due" and to segment "Jan". Segment "Date" is also vertically related to segment "Due", which is horizontally related to segment "Balance" and to segment "$66". In FIG. 2D, segment "Subtotal" is horizontally related to segment "$61" and is vertically related to segment "Tax", which is horizontally related to segment "$5". Segment "Tax" is also vertically related to segment "Total" which is horizontally related to segment "$6".

The document images 102 form a dataset consisting of a number of document images culled from a larger set of annotated documents. In one example, a dataset of 3446 invoice documents for document images 102 was generated by culling it down from 20929 annotated documents. This culling was performed to ensure a uniform distribution of layout types. In this example, each document was manually annotated for keys and key-value bounding boxes. Such manual annotation may contain errors-no formal study of annotation errors has yet been performed, but cases of false negatives and false positives exist in a small but noticeable quantity. Documents were selected such that each layout only occurs once in the entire dataset. This was performed using locally connected subgraph isomorphism and Density-Based Spatial Clustering of Applications with Noise (DBSCAN), as described by Ester, Martin; Kriegel, Hans-Peter; Sander, Jörg; Xu, Xiaowei; Simoudis, Evangelos; Han, Jiawei; Fayyad, Usama M., eds., "A density-based algorithm for discovering clusters in large spatial databases with noise", Proceedings of the Second International Conference on Knowledge Discovery and Data Mining (KDD-96), AAAI Press. pp. 226-231. The data was then split into a training set of 2756 documents and a test set of 689 documents, comprising an approximate 80/20% allocation of training/test documents from the dataset of 3446 documents. In total there were 640,242 segments in the training dataset with 72,287 being key segments or about 11%. Alternatively, the dataset of document images 102 may be generated by automated annotation, such as described in U.S. patent application Ser. No. 15/858,976, filed on Dec. 29, 2017 entitled "AUTOMATIC KEY/VALUE PAIR EXTRACTION FROM DOCUMENT IMAGES USING DEEP LEARNING", which application is assigned to the assignee of the present application, and which is herein incorporated by reference in its entirety.

Turning back to FIG. 1, subword embedding module 104 processes text segments 110 to generate a set of n-dimensional vectors 106 for each document. In one embodiment subword embedding module 104 employs FastText which is a library for text classification and representation and is described in "Enriching Word Vectors with Subword Information", Piotr Bojanowski, Edouard Grave, Armand Joulin, Tomas Mikolov, arXiv:1607.04606 [cs.CL]. As described by Bojanowski et al, subword embeddings utilize a vector representation of each character n-gram where words (in our case text segments) are represented by the sum of the representations. This type of representation is helpful in the context of problem domains with large vocabularies and/or many rare words. In the context of document images, these representations help overcome errors introduced due to error from the OCR system. Word semantics are still maintained even when small changes in words (insertion/deletion/substitution of characters) are introduced from the OCR system because meaning can still be derived from other non-affected n-grams in the OCRd word. In one embodiment, a context window of 2 and a dimensionality of 64 was selected for processing of the document images 102 by FastText. Subword embeddings (n-character segments within a word, as described by Bojanowski et al) were chosen because of their ability to handle out-of-vocabulary tokens. The resulting vector set 106 for each processed document contains a 64-dimension vector for each two-character (the context window) subset.

In the embodiment shown in FIG. 1, subword embedding 104 is performed on the text segments generated from the document images 102, in other words, the same corpus as the training documents that are annotated at 116, 118. In an alternative embodiment subword embedding may employ a corpus different from the training documents, for example, from Wikipedia or some other large text database. In general, subword embedding 104 should occur before feature vectors are generated at 114 because the feature vectors are composed of embedding vectors.

In one embodiment, a simple model of segment overlap, seen in FIGS. 3A and 3B is employed such that a token is chosen to be a contextual feature if it physically overlaps the selected token by 50% and is the closest in the relevant direction, in order to identify the relationships explained in connection with FIGS. 2B, 2C and 2D. FIG. 3A shows the considered local context for constructing a feature vector for a given segment, 302. Segments 303, 304, 305, and 306 are representations of text segments generated by the OCR module 108, each containing digitized text and 2-d spatial coordinates relative to the document. In one embodiment a maximum of 4 context segments from 4 relative directions are considered. The 4 context segments come from the 4 contexts "immediately to the left of the given segment", "immediately to the right of the given segment", "immediately above the given segment" and "immediately underneath the given segment". In one embodiment these local context segments are chosen based on the amount of X-axis or Y-axis overlap between the context segment and the given segment, here 302. "up segments" 303 and "down segments" 305 must have >50% of their length overlapped by 302, or 302 must be >50% overlapped by the considered up or down segment. In the event of multiple candidate overlap segments, the context segment is chosen so that it is vertically closest. When candidate segments overlap and are equally vertically close, the final context segment is chosen such that it its X-coordinate midpoint is closest to the given segments X-coordinate midpoint. Likewise, "left context" and "right context" segments are chosen with similar logic while exchanging coordinate axes.

Figure 4:
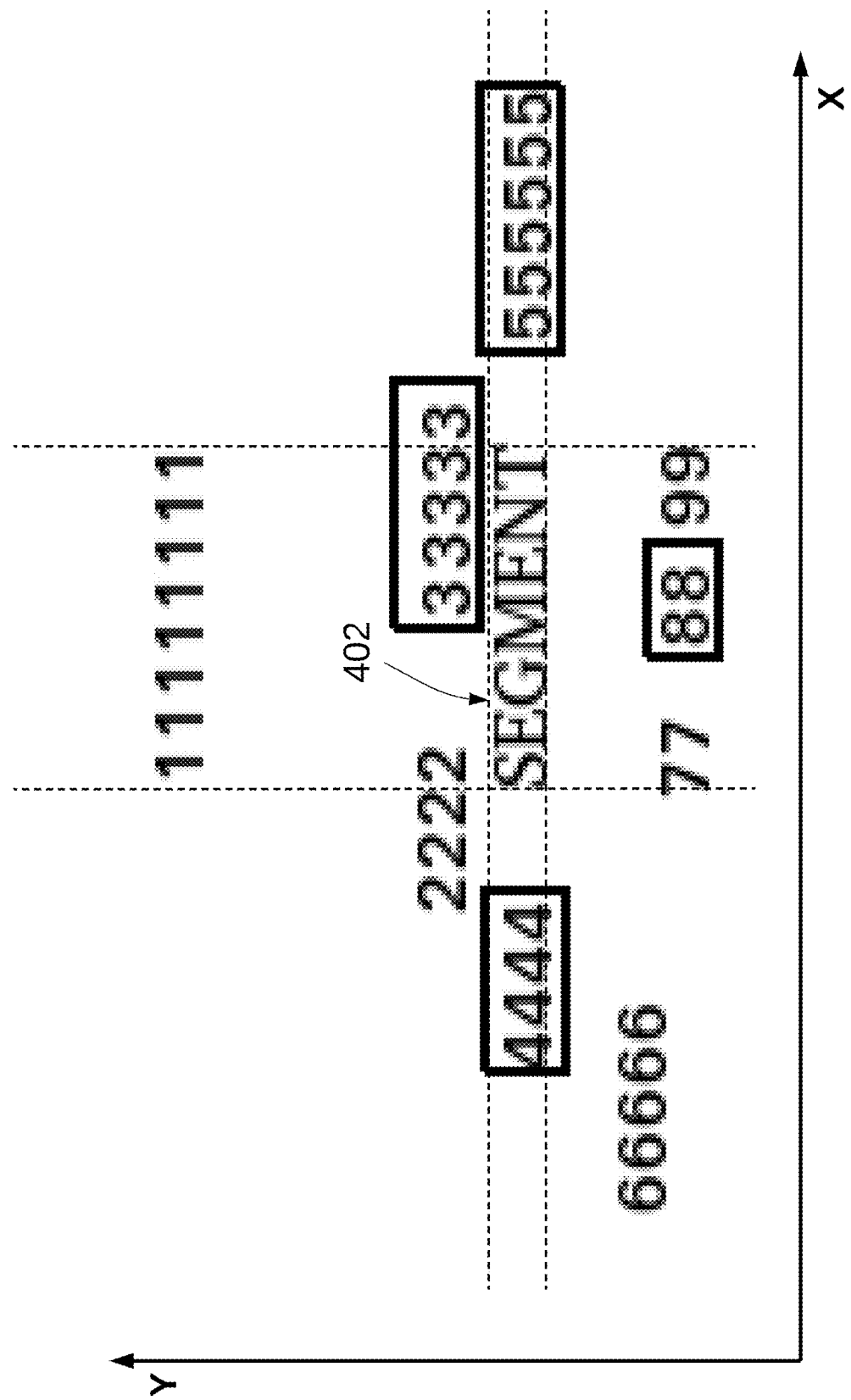
FIG. 4 illustrates an example of segment overlap.

An example of segment selection, for an example segment 402, may be seen in FIG. 4, where the example segment 402 is seen bounded to the left and right and above and below by dotted lines to facilitate understanding of the following explanation. In FIG. 4, segment "2222" is not considered for any context because it does not overlap nor is it overlapped by >50% in any direction by the given segment 402. Segment "11111111" is overlapped by and overlaps the given segment 402, but because segment "33333" is overlapped by >50% by the given segment 402 and is closer in the Y-axis direction, segment "33333" is chosen as a local context for the "up" position. Likewise, segments "4444" and "555555" both overlap and are overlapped by the given segment 402 and each are closest in the X-direction on either side of the given segment 402. Segment "4444" will be chosen as the left context and segment "555555" as the right context". In this context, the term "overlap" has a slightly different meaning than its ordinary meaning and can be seen to include segments along the X-axis (the axis along which the given segment extends) that are the closest to the given segment 402. Segment "66666" cannot be considered for context because it does not overlap the given segment 402 in any direction. Segments "77", "88" and "99" all are overlapped by >50% in the X-direction by the given segment 402 and they all have the same Y-axis coordinates. Segment "88" is chosen as the bottom context because its X-axis midpoint is closest to the X-axis midpoint of the given segment 402.

The text segments are then mapped at 112 to the learned n-d vectors 106 in a manner illustrated in FIGS. 3A, 3B and 3C to generate a set of feature vectors 114 for each document. As seen in FIG. 3A, a selected token (segment) 302 is seen surrounded by four other segments, 303 on top, 304 to the right, 305 below and 306 to the left. As seen at FIG. 3B, the subword embedding of each token is taken and then concatenated along with the subword embedding of the selected token, giving a feature vector with a dimensionality of 64*5=320. The structure of the resulting vector is seen in FIG. 3C. This is done for each word segment in the document. The target variable is chosen according to the annotations for keys within a document.

As noted above, each of the document images 102 is annotated at 116 to identify semantic categories for fields in the document image to form a set of annotated documents 118. The feature vectors 114 for each document are then mapped at 120 to an annotated form of the same document to generate training data 122 for supervised learning by training module 124. A supervised learning engine 126 is trained with training data 122 to generate trained model 128. The supervised learning engine 126 in one embodiment may take the form of Gradient Boosted Trees which has adequate performance and an ability to train quickly on large datasets. Gradient boosting is a machine learning technique for regression and classification problems, which produces a prediction model in the form of a group of weak prediction models, typically decision trees. It builds the prediction model in a stage-wise fashion like other boosting methods. It also generalizes the model by allowing optimization of an arbitrary differentiable loss function. In other embodiments, other classification engines capable of binary classification may be employed.

The trained model 128 may be employed in connection with an inference engine 130 to map a feature vector to a semantic category. The inference engine 130 uses the trained model 128 to infer the semantic category based on the feature vector. In this stage the annotated semantic category of the vector may not be known or in any case will not be used in 130. Here the inference engine 130 provides a means to compute the semantic category id based on the specific values in the feature vector.

Figure 5:
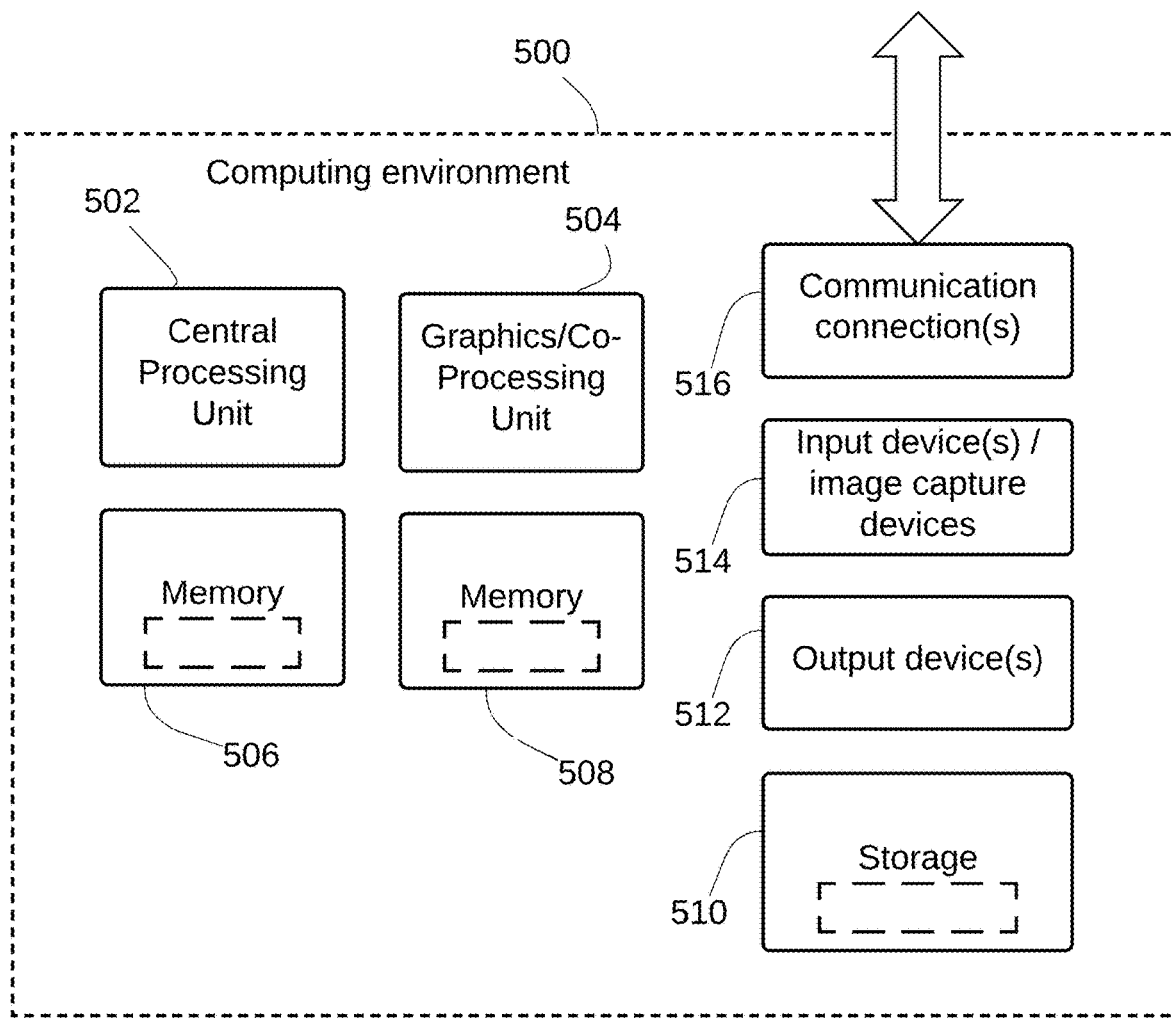
FIG. 5 illustrates a block diagram of hardware that may be employed in an implementation of the system 100.

FIG. 5 depicts a generalized example of a suitable general-purpose computing system 500 in which the described innovations may be implemented in order to improve the processing speed and efficiency with which the computing system 500 operates to perform the functions disclosed herein. With reference to FIG. 5 the computing system 500 includes one or more processing units 502, 504 and memory 506, 508. The processing units 502, 506 execute computer-executable instructions. A processing unit can be a general-purpose central processing unit (CPU), processor in an application-specific integrated circuit (ASIC) or any other type of processor. The tangible memory 506, 508 may be volatile memory (e.g., registers, cache, RAM), non-volatile memory (e.g., ROM, EEPROM, flash memory, etc.), or some combination of the two, accessible by the processing unit(s). The hardware components in FIG. 5 may be standard hardware components, or alternatively, some embodiments may employ specialized hardware components to further increase the operating efficiency and speed with which the system 100 operates.

Computing system 500 may have additional features such as for example, storage 510, one or more input devices 514, one or more output devices 512, and one or more communication connections 516. An interconnection mechanism (not shown) such as a bus, controller, or network interconnects the components of the computing system 500. Typically, operating system software (not shown) provides an operating system for other software executing in the computing system 500, and coordinates activities of the components of the computing system 500.

The tangible storage 510 may be removable or non-removable, and includes magnetic disks, magnetic tapes or cassettes, CD-ROMs, DVDs, or any other medium which can be used to store information in a non-transitory way and which can be accessed within the computing system 500. The storage 510 stores instructions for the software implementing one or more innovations described herein.

The input device(s) 514 may be a touch input device such as a keyboard, mouse, pen, or trackball, a voice input device, a scanning device, or another device that provides input to the computing system 500. For video encoding, the input device(s) 514 may be a camera, video card, TV tuner card, or similar device that accepts video input in analog or digital form, or a CD-ROM or CD-RW that reads video samples into the computing system 500. The output device(s) 512 may be a display, printer, speaker, CD-writer, or another device that provides output from the computing system 500.

The communication connection(s) 516 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "computing device" are used interchangeably herein. Unless the context clearly indicates otherwise, neither term implies any limitation on a type of computing system or computing device. In general, a computing system or computing device can be local or distributed and can include any combination of special-purpose hardware and/or general-purpose hardware with software implementing the functionality described herein.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

What is claimed is:

1. A computerized method for identifying keywords in a document image, comprising:
   (i) retrieving a document image from a set of document images where each document in the set of document images contains information organized in a two-dimensional structure and contains keywords, where each keyword of a set of the keywords has a value associated therewith;
   (ii) processing the document image to identify text segments contained within the document image;
   (iii) processing the text segments to identify subword embeddings associated with each of the text segments, wherein each of the subword embeddings associated with a text segment represents a character group in the document image,
   (iv) generating an n-dimensional vector for each text segment from its subword embeddings;
   (v) for each identified text segment, mapping one or more of the n-dimensional vectors to each of the identified text segments to generate for each identified text segment, a feature vector which describes a local context of the identified text segment;
   (vi) retrieving an annotated version of the document image containing a visual indication annotation associated with each visual indication of a keyword in the document;
   (vii) associating with each visual indication of a keyword in the annotated version of the document image a corresponding feature vector to generate a training document; and
   (viii) repeating steps (i) through (vii) for each document from the set of document images to generate a set of training documents.

2. The computerized method of claim 1 wherein each of the subword embeddings utilize a vector representation of one or more n-character groupings of a word, where n is a preselected integer and where a word is represented by a sum of the vector representations.

3. The computerized method of claim 1 wherein step (v) comprises:
   selecting for the identified text segment one or more of text segments that are positioned above, below, to the left and to the right of the identified text segment.

4. The computerized method of claim 1 wherein step (v) comprises:
   selecting for the identified text segment one or more of text segments that are positioned above, below, to the left and to the right of the identified text segment, and which overlap the identified text segment by greater than a preselected overlap amount.

5. The computerized method of claim 1 wherein step (v) comprises:
   selecting for the identified text segment one or more of text segments that are positioned above, below, to the left and to the right of the identified text segment, and wherein the feature vector comprises a concatenation of vectors corresponding to the identified text segment and of a vector corresponding to each of the text segments that are positioned above, below, to the left and to the right of the identified text segment.

6. The computerized method of claim 1 further comprising providing the set of training documents to a supervised learning engine to generate a trained model.

7. A document processing system comprising:
   data storage for storing a set of document images where each document in the set of document images contains information organized in a two-dimensional structure and contains keywords, where each keyword of a set of the keywords has a value associated therewith; and a processor operatively coupled to the data storage and configured to execute instructions that when executed cause the processor to generate a set of training documents from at least a portion of the documents in the set of document images by, for each document in the portion of the documents in the set of document images:

retrieving a document image from the data storage;

processing the document image to identify text segments contained within the document image;

processing the text segments to identify subword embeddings associated with each of the text segments, wherein each subword embedding associated with a text segment represents a character group in the document image, generating an n-dimensional vector for each text segment from its subword embeddings;

for each identified text segment, mapping one or more of the n-dimensional vectors to each of the identified text segments to generate for each identified text segment, a feature vector which describes a local context of the identified text segment;

retrieving an annotated version of the document image containing a visual indication annotation associated with each visual indication of a keyword in the document; and associating with each visual indication of a keyword in the annotated version of the document image a corresponding feature vector to generate a training document for the set of training documents.

8. The document processing system of claim 7 wherein the subword embeddings utilize a vector representation of one or more n-character groupings of a word, where n is a preselected integer and where a word is represented by a sum of the vector representations.

9. The document processing system of claim 7 wherein the instructions that when executed cause, for each identified text segment, mapping one or more of the n-dimensional vectors to each of the identified text segments to generate for each identified text segment, a feature vector which describes a local context of the identified text segment, comprise instructions that when executed cause the processor to:

select for the identified text segment one or more of text segments that are positioned above, below, to the left and to the right of the identified text segment.

10. The document processing system of claim 7 wherein the instructions that when executed cause, for each identified text segment, mapping one or more of the n-dimensional vectors to each of the identified text segments to generate for each identified text segment, a feature vector which describes a local context of the identified text segment, comprise instructions that when executed cause the processor to:

select for the identified text segment one or more of text segments that are positioned above, below, to the left and to the right of the identified text segment and which overlap the identified text segment by greater than a preselected overlap amount.

11. The document processing system of claim 7 wherein the instructions that when executed cause, for each identified text segment, mapping one or more of the n-dimensional vectors to each of the identified text segments to generate for each identified text segment, a feature vector which describes a local context of the identified text segment, comprise instructions that when executed cause the processor to:

select for the identified text segment one or more of text segments that are positioned above, below, to the left and to the right of the identified text segment, and wherein the feature vector comprises a concatenation of vectors corresponding to the identified text segment and of a vector corresponding to each of the text segments that are positioned above, below, to the left and to the right of the identified text segment.

12. The document processing system of claim 7 further comprising instructions that when executed cause the processor to provide the set of training documents to a supervised learning engine to generate a trained model.

13. A computer program product for generating a set of training documents, the computer program product comprising a non-transitory computer readable storage medium and including instructions for causing the computer system to execute a method for generating a set of training documents, the method comprising the actions of:

retrieving a document image from data storage which has stored thereon a set of document images where each document in the set of document images contains information organized in a two-dimensional structure and contains keywords, where each keyword of a set of the keywords has a value associated therewith;

generating the set of training documents from at least a portion of the documents in the set of document images, by, for each document in the portion of the documents in the set of document images:

processing the document image to identify text segments contained within the document image;

processing the text segments to identify subword embeddings associated with each of the text segments, wherein each subword embedding associated with a text segment represents a character group in the document image, generating an n-dimensional vector for each text segment from its subword embeddings;

for each identified text segment, mapping one or more of the n-dimensional vectors to each of the identified text segments to generate for each identified text segment, a feature vector which describes a local context of the identified text segment;

retrieving an annotated version of the document image containing a visual indication annotation associated with each visual indication of a keyword in the document; and associating with each visual indication of a keyword in the annotated version of the document image a corresponding feature vector to generate a training document for the set of training documents.

14. The computer program product of claim 13 wherein the subword embeddings utilize a vector representation of one or more n-character groupings of a word, where n is a preselected integer and where a word is represented by a sum of the vector representations.

15. The computer program product of claim 13 wherein the operation of for each identified text segment, mapping one or more of the n-dimensional vectors to each of the identified text segments to generate for each identified text segment, a feature vector which describes a local context of the identified text segment, comprises:

selecting for the identified text segment one or more of text segments that are positioned above, below, to the left and to the right of the identified text segment.

16. The computer program product of claim 13 wherein the operation of for each identified text segment, mapping one or more of the n-dimensional vectors to each of the identified text segments to generate for each identified text segment, a feature vector which describes a local context of the identified text segment, comprises:
- selecting for the identified text segment one or more of text segments that are positioned above, below, to the left and to the right of the identified text segment and which overlap the identified text segment by greater than a preselected overlap amount.

17. The computer program product of claim 13 wherein the operation of for each identified text segment, mapping one or more of the n-dimensional vectors to each of the identified text segments to generate for each identified text segment, a feature vector which describes a local context of the identified text segment, comprises:
- selecting for the identified text segment one or more of text segments that are positioned above, below, to the left and to the right of the identified text segment, and wherein the feature vector comprises a concatenation of vectors corresponding to the identified text segment and of a vector corresponding to each of the text segments that are positioned above, below, to the left and to the right of the identified text segment.

18. The computer program product of claim 13 further comprising the operation of providing the set of training documents to a supervised learning engine to generate a trained model.

* * * * *